(12) United States Patent
Burch (10) Patent No.: US 10,278,332 B2
(45) Date of Patent: May 7, 2019

(54) CHOPPER TIMING ADJUSTMENT

(71) Applicant: Deere & Company, Moline, IL (US)

(72) Inventor: Guy Burch, Thibodaux, LA (US)

(73) Assignee: DEERE & COMPANY, Moline, IL (US)

(*) Notice: Subject to any disclaimer, the term of this patent is extended or adjusted under 35 U.S.C. 154(b) by 3 days.

(21) Appl. No.: 15/286,071

(22) Filed: Oct. 5, 2016

(65) Prior Publication Data

US 2018/0092306 A1    Apr. 5, 2018

(51) Int. Cl.
*A01D 69/06* (2006.01)
*A01D 45/10* (2006.01)

(52) U.S. Cl.
CPC .................. *A01D 45/10* (2013.01)

(58) Field of Classification Search
CPC ........ A01D 69/06; A01D 45/10; A01F 29/095
See application file for complete search history.

(56) References Cited

U.S. PATENT DOCUMENTS

| | | |
|---|---|---|
| 3,141,281 A | 7/1964 | Gaunt et al. |
| 3,673,774 A | 7/1972 | Mizzi |
| 3,958,397 A | 5/1976 | Stiff |
| 4,065,912 A | 1/1978 | Quick |
| 4,089,396 A | 5/1978 | Quick |
| 4,555,896 A | 12/1985 | Stiff et al. |
| 5,031,392 A | 7/1991 | Baker |
| 5,622,034 A * | 4/1997 | Dommert ............... A01D 45/10 192/53.6 |
| 5,890,353 A * | 4/1999 | Brown ................... A01D 45/10 241/236 |
| 6,935,095 B1 | 8/2005 | Sludder |
| 8,615,978 B2 | 12/2013 | Hinds |
| 9,433,149 B2 * | 9/2016 | Mixon ................... A01D 45/10 |
| 9,731,681 B2 * | 8/2017 | Behrens .............. B60R 25/0211 |
| 9,765,761 B1 * | 9/2017 | Fox .......................... F04B 1/26 |
| 9,772,013 B2 * | 9/2017 | Tsai ....................... F16H 25/20 |
| 2014/0053523 A1 | 2/2014 | Straeter et al. |
| 2014/0096660 A1 | 4/2014 | Turner |
| 2014/0311262 A1 * | 10/2014 | Hayashi ................. F16C 35/02 74/89.14 |
| 2015/0183436 A1 | 7/2015 | Rekow et al. |
| 2015/0292608 A1 | 10/2015 | McKinzie |
| 2015/0327438 A1 | 11/2015 | Cazenave et al. |
| 2016/0090091 A1 | 3/2016 | Gugel et al. |
| 2016/0131205 A1 * | 5/2016 | Essenmacher ........ F16D 41/125 192/41 A |
| 2016/0235010 A1 | 8/2016 | Fattepur et al. |

(Continued)

FOREIGN PATENT DOCUMENTS

| | | |
|---|---|---|
| DE | 102005051014 A1 | 5/2007 |
| WO | 2013134397 A1 | 9/2013 |
| WO | 2014031314 A3 | 5/2014 |

OTHER PUBLICATIONS

Background Information (1 page) (prior art before Feb. 18, 2015).

(Continued)

*Primary Examiner* — Robert E Pezzuto
*Assistant Examiner* — Adam J Behrens (57) ABSTRACT

A chopping system for a crop harvester comprises a chopper-timing adjuster configured to adjust a timing of operation between a first chopper and a second chopper by use of a worm.

16 Claims, 6 Drawing Sheets

(56) References Cited

U.S. PATENT DOCUMENTS

2016/0363210 A1* 12/2016 Perkins ............... F16H 57/0471
2017/0314643 A1* 11/2017 Hudson ................... F16H 1/203

OTHER PUBLICATIONS

Sugarcane Harvester Chopper Drum Timing Description (4 pages) (prior art before Oct. 5, 2016).
Fairchild Industrial Products Company, Catalog No. 205L, Phase Shifting Differential Transmissions (Nov. 1997) (16 pages).
Andantex USA Inc., D-Series Differential Phase Shifters (Aug. 2008) (16 pages).
Additional Background Information (1 page) (prior art before Oct. 5, 2016).

* cited by examiner

CHOPPER TIMING ADJUSTMENT

FIELD OF THE DISCLOSURE

The present disclosure relates to a chopping system for a crop harvester, such as, for example, a chopping system for a sugarcane harvester.

BACKGROUND OF THE DISCLOSURE

A sugarcane harvester has a rotatable first chopper and a rotatable second chopper that are configured to rotate about their respective axes of rotation to cooperatively cut sugarcane stalk into longitudinal segments called "billets." Corresponding blades of the choppers cooperate to compressively cut the stalk into billets. Over time, engagement between the blades may become loose due, for example, to blade wear, or if a bolted joint holding the choppers in place relative to one another becomes loose (e.g., due to insufficient tightening of the bolt and/or a rock hit), decreasing the effectiveness of the chopping operation. The angular position of each chopper may be adjusted relative to the other chopper to adjust the timing of operation of the choppers (e.g., each chopper can be manually angularly adjusted). This has been done by using a bolted joint that has to be loosened to adjust the timing of the choppers. Performing this task can be cumbersome. It requires several tools and partially disassembling a gearbox that drives the choppers to access the bolt. Other designs have attempted to make this a more service friendly task. These include, for example, clutch designs, external bolted joint designs, concentric shaft designs. None of these have become widespread in their use for various reasons.

SUMMARY OF THE DISCLOSURE

According to an aspect of the present disclosure, a chopping system for a crop harvester comprises a first chopper, a second chopper, and a chopper-timing adjuster. The first chopper has an axis of rotation, and the second chopper has an axis of rotation. The first and second choppers are configured to rotate about their respective axes of rotation to cooperatively cut crop stalk into billets. The chopper-timing adjuster is configured to provide a difference in angular displacement between the first chopper relative to its axis of rotation and the second chopper relative to its axis of rotation to adjust a timing of operation between the first and second choppers. The chopper-timing adjuster comprises a worm to drive the difference in angular displacement.

According to another aspect of the present disclosure, a chopper-timing adjuster is provided for a chopping system of a crop harvester. The chopping system comprises a first chopper having an axis of rotation and a second chopper having an axis of rotation. The first and second choppers are configured to rotate about their respective axes of rotation to cooperatively cut crop stalk into billets. The chopper-timing adjuster comprises a worm and is drivingly coupled to the first chopper to provide an angular displacement of the first chopper, relative to its axis of rotation and to the second chopper, via the worm to adjust a timing of operation between the first and second choppers.

The above and other features will become apparent from the following description and accompanying drawings.

BRIEF DESCRIPTION OF THE DRAWINGS

The detailed description of the drawings refers to the accompanying figures in which.

DETAILED DESCRIPTION OF THE DRAWINGS

Figure 1:
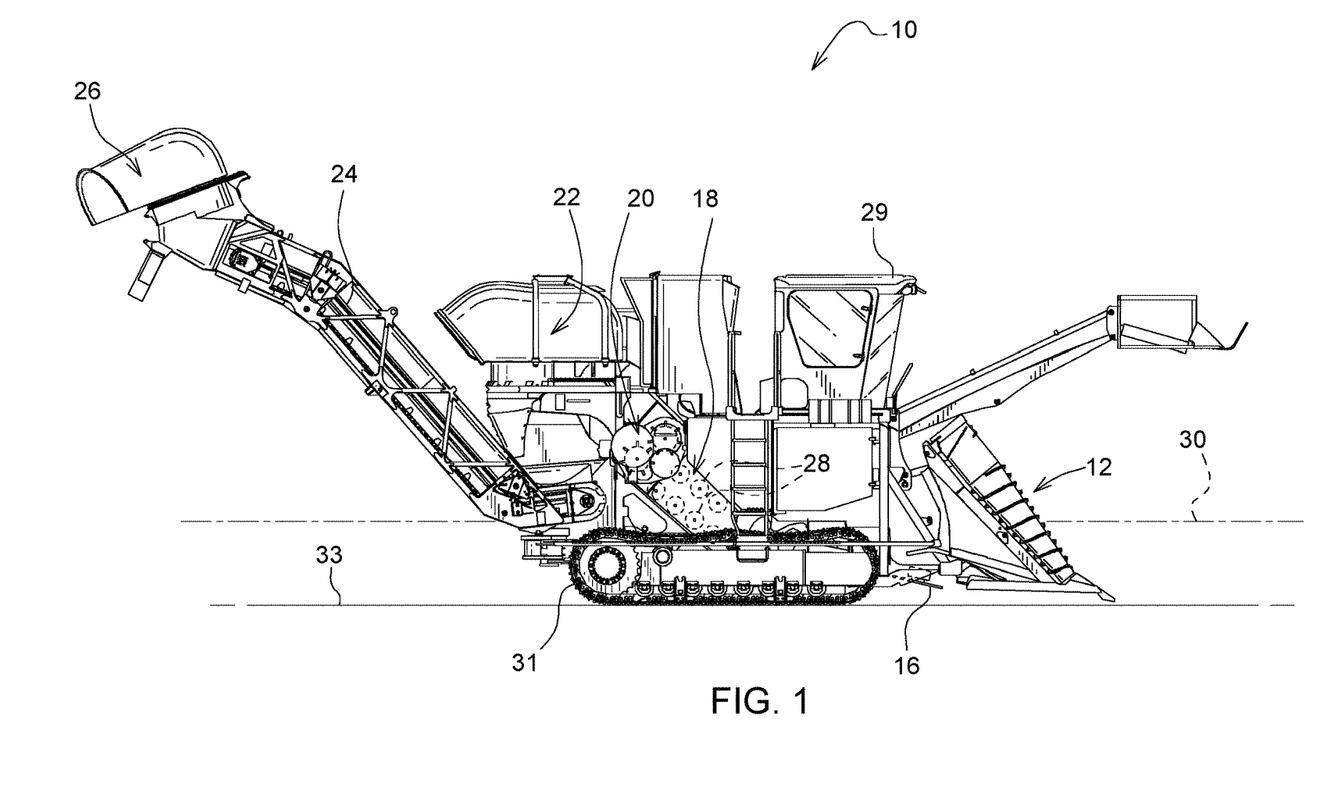
FIG. 1 is a side elevation view showing a crop harvester in the form of, for example, a sugarcane harvester.

Referring to FIG. 1, a crop harvester 10 is configured to harvest a stalk crop. Illustratively, the crop harvester 10 is a sugarcane harvester. For example, the harvester 10 comprises a left crop divider 12 and a right crop divider 12 (only the left crop divider 12 being shown), an upper knockdown roller and a lower knockdown roller (the knockdown rollers not shown), a left basecutter 16 and a right basecutter 16 (only the left basecutter 16 being shown), a feed system 18, a chopping system 20, a primary extractor 22, an elevator 24, and a secondary extractor 26. The left and right crop dividers 12 are configured to contact the crop so as to lean it forward. The left and right basecutters are configured to sever the stalk of the crop knocked down by the knockdown rollers at a location near the ground. The feed system 18 comprises a number of feed rollers 28 and is configured to receive from the basecutters 16 a mat of severed crop material and to feed the mat rearwardly. The chopping system 20 is configured to receive the mat from the feed system 18 and to cut the crop stalk into billets. The primary extractor 22 is positioned downstream from the chopping system 20 and is configured to separate crop residue (e.g., leafy material) from the billets and remove the crop residue from the crop harvester 10. The elevator 24 is positioned at the rear of the machine to receive the cleaned flow of billets and is configured to convey the billets to an elevated position where they are discharged into a bin to be hauled away. The secondary extractor 26 is positioned near the top of the elevator 24 and is configured to further separate crop residue from the billets and remove the crop residue from the crop harvester 10. Terms such as left and right are relative to a central fore-aft axis 30 of the harvester 10.

The harvester 10 comprises an operator's station 29 and traction elements 31. A human operator can operate the harvester 10 from the operator's station 29. The traction elements 31 are positioned on the left and right sides of the harvester 10 for engaging the ground 33 and propelling the harvester 10. Each traction element 31 may be, for example, a track unit or a ground-engaging wheel (e.g., one track unit on each side of the harvester 10 as shown with respect to the right side in FIG. 1).

Figure 2:
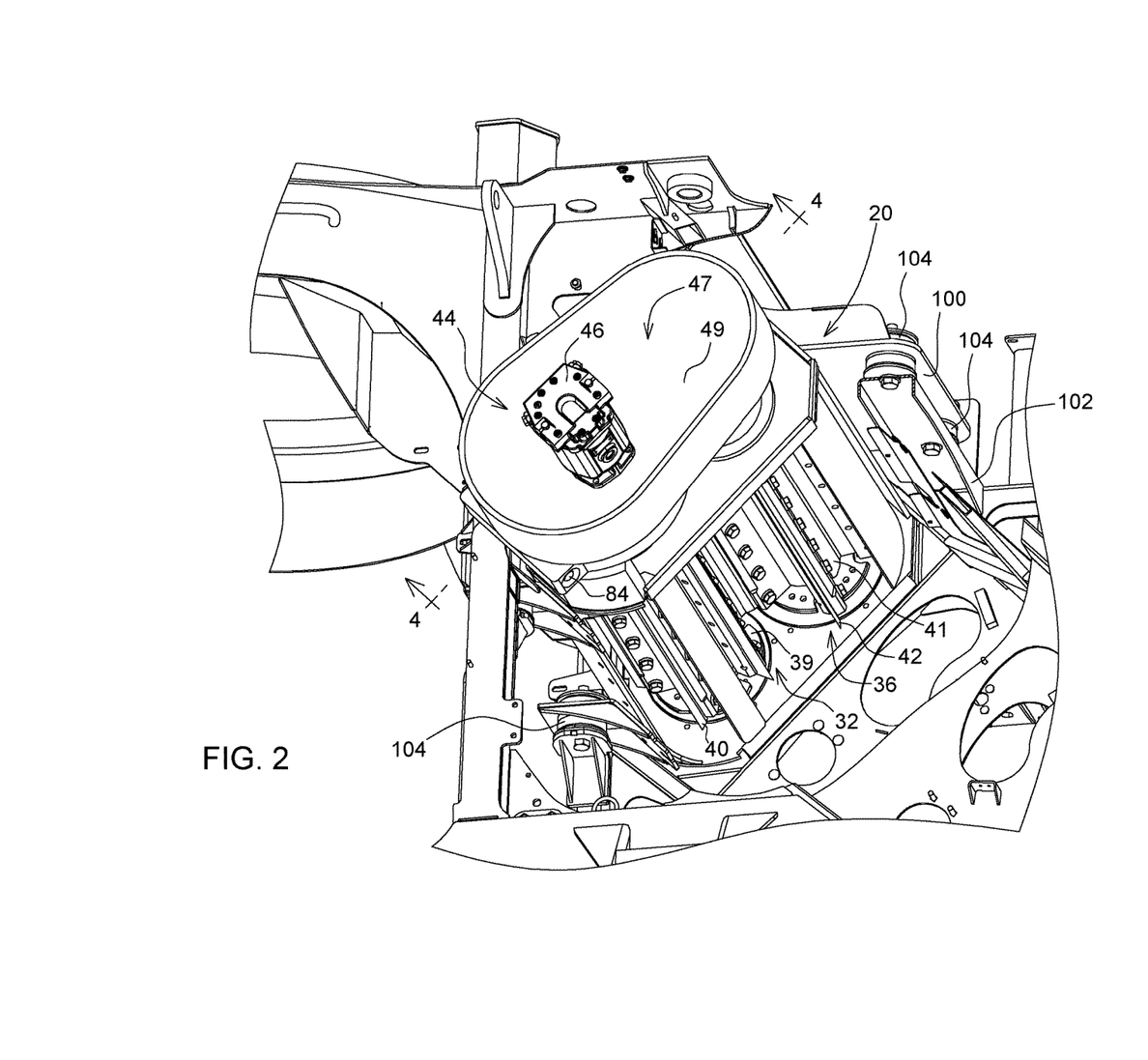
FIG. 2 is a perspective view showing a chopping system of the crop harvester.
Figure 3:
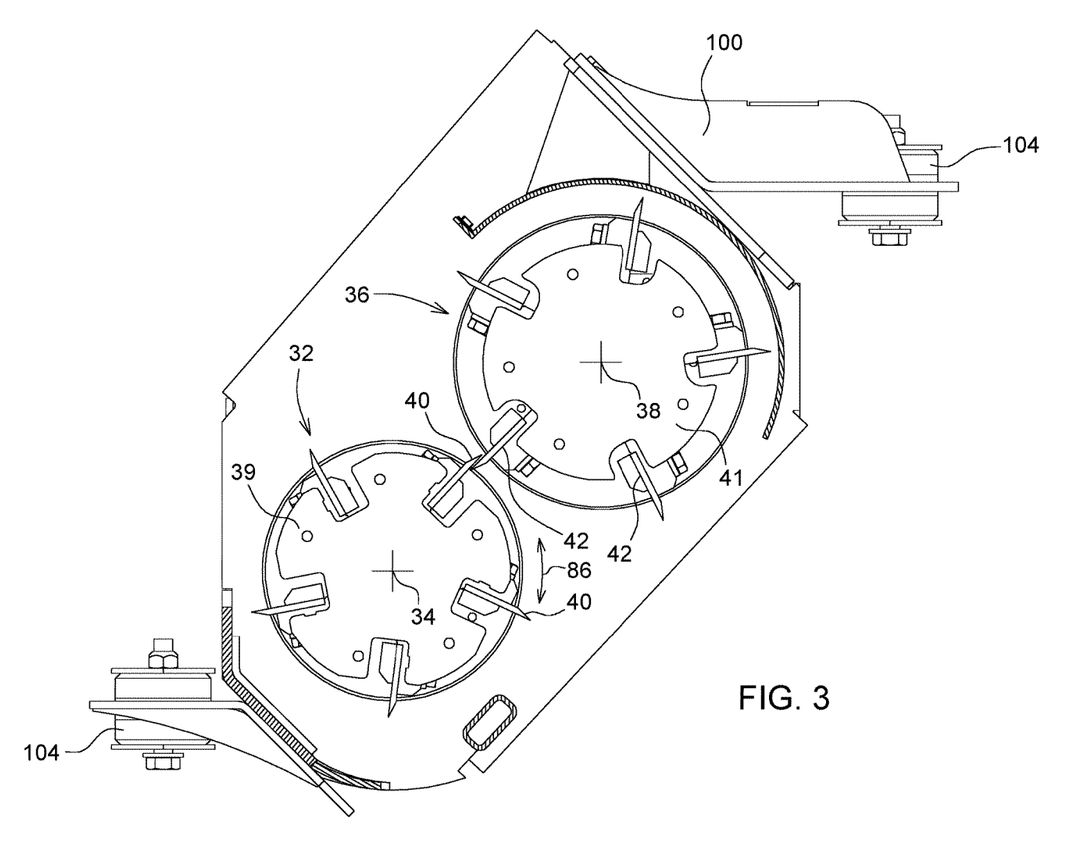
FIG. 3 is an end elevation view showing first and second choppers of the chopping system.

Referring to FIGS. 2 and 3, the chopping system 20 comprises a first chopper 32 having an axis of rotation 34 and a second chopper 36 having an axis of rotation 38. The first chopper 32 comprises a drum 39 mounted for rotation about the axis of rotation 34 and a plurality of blades 40 mounted to the drum 39 and spaced evenly about the periphery of the drum 39 for rotation therewith. The second chopper 36 comprises a drum 41 mounted for rotation about the axis of rotation 38 and a plurality of blades 42 mounted to the drum 41 and spaced evenly about the periphery of the drum 41 for rotation therewith.

The first and second choppers 32, 36 are configured to rotate about their respective axes of rotation 34, 38 to cooperatively cut crop stalk into billets. As the choppers 32, 36 rotate, corresponding blades 42 of the choppers 32, 36 cooperate to compressively cut the crop stalk into billets.

The chopping system 20 comprises a chopper drive 44 configured to drive rotation of the choppers 32, 36. The chopper drive 44 comprises a motor 46 (e.g., a hydraulic motor) and a gearbox 47. The motor 46 comprises a motor body 48 mounted and positioned external to a housing 49 of the gearbox 47, and a shaft 50 extending into the housing 49.

Figure 4:
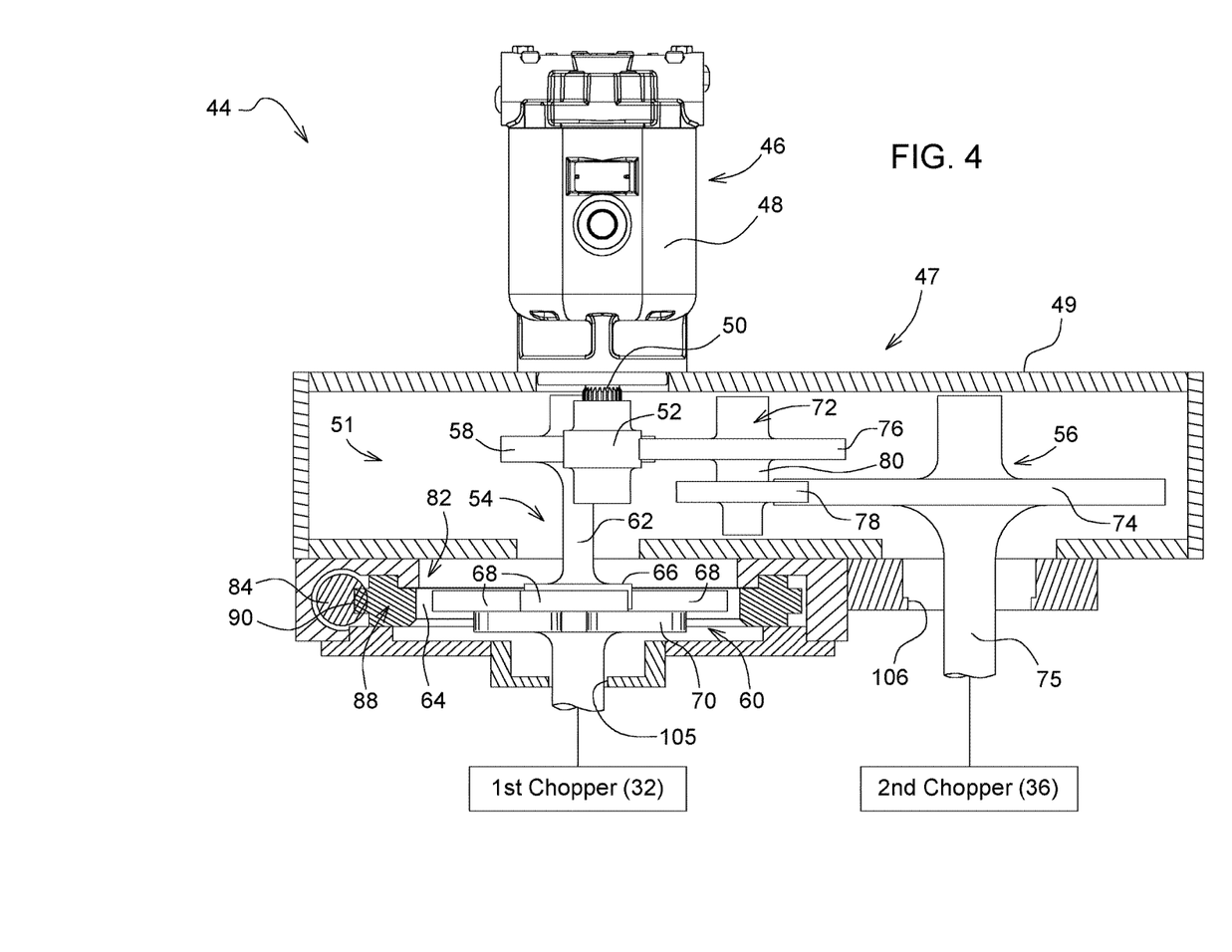
FIG. 4 is a sectional view, taken along lines 4-4 of FIG. 3, showing a gearbox of the chopping system, with portions broken away to show a transmission of the gearbox.
Figure 5:
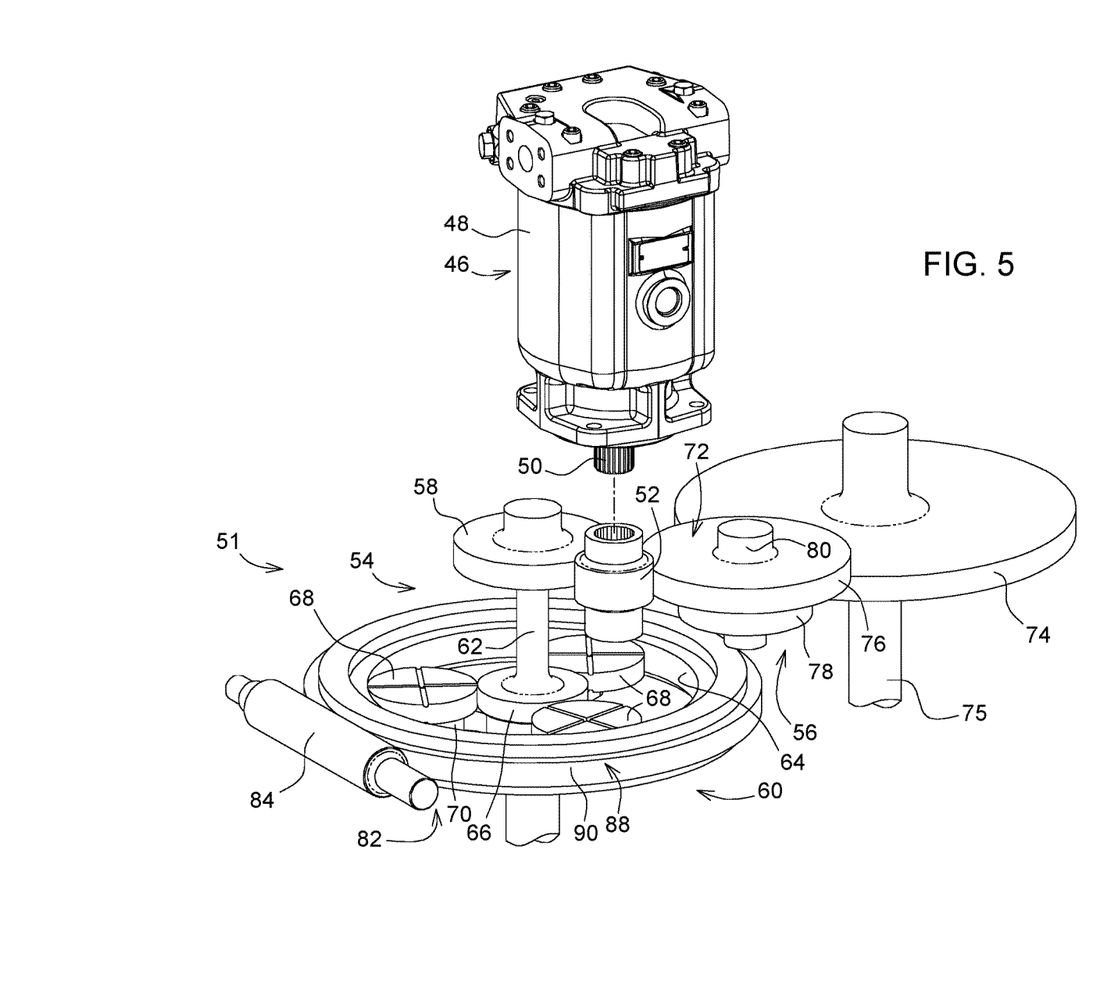
FIG. 5 is a perspective view showing the transmission of the gearbox and a worm to drive a difference in angular displacement between the choppers.

Referring to FIGS. 4 and 5, the gearbox 47 comprises a transmission 51 positioned in the housing 49. The transmission 51 comprises a pinion 52, a first drive path 54, and a second drive path 56. The motor 46 is drivingly coupled to the first chopper 32 via the pinion 52 and the first drive path 54 and to the second chopper 36 via the pinion 52 and the second drive path 56.

The first drive path 54 comprises an intermediate gear 58 and a gearset 60 coupled to the intermediate gear 58 via a shaft 62. The pinion 52 meshes with the intermediate gear 54, the pinion 52 having a smaller radius than the intermediate gear 54. The gearset 60 is drivingly coupled to the first chopper 32.

The gearset 60 is positioned in the housing 49, and is configured, for example, as a planetary gearset comprising a ring gear 64, a sun gear 66, planets 68 meshing with the sun gear 66 and the ring gear 64, and a planet carrier 70 mounted to the planets 68 and drivingly coupled to the drum 39 of the first chopper 32 (e.g., the planet carrier 70 is mounted on a shaft of the drum 39 via a spline coupling). The sun gear 66 and the intermediate gear 54 are mounted to the shaft 62 (e.g., the gears 54, 66 and the shaft 62 are formed collectively as a one-piece structure), the sun gear 66 having a smaller radius than the intermediate gear 54. A planetary gearset may thus be included in the chopper drive 44, in which case the first drive path 54 comprises the sun gear 66, the planets 68, and the planet carrier 70.

The second drive path 56 comprises an idler stack 72 and an output gear 74. The idler stack 72 comprises a first gear 76 and a second gear 78 having a radius smaller than the first gear 76. The first and second gears 76, 78 are mounted on a shaft 80 (e.g., the first gear 76 and the shaft 80 are formed collectively as a one-piece structure and the second gear 78 may be mounted on the shaft 80 via a spline coupling). The pinion 52 meshes with the first gear 76, the pinion 52 having a radius smaller than the first gear 76. The second gear 78 meshes with the output gear 74, the second gear 78 having a radius smaller than the output gear 74. The output gear 74 is drivingly coupled to the drum 41 of the second chopper 36 (e.g., the output gear 74 is mounted on a shaft of the drum 41 via a spline coupling).

The chopping system 20 comprises a chopper-timing adjuster 82. The adjuster 82 comprises a worm 84 and is configured to adjust a timing of operation between the first chopper 32 and the second chopper 36 by use of the worm 84. The adjuster 82 is configured to provide a difference in angular displacement between the first chopper 32 relative to its axis of rotation 34 and the second chopper 36 relative to its axis of rotation 38 to adjust a timing of operation between the first and second choppers 32, 36. The worm 84 is provided to drive the difference in angular displacement.

The adjuster 82 is drivingly coupled to the first chopper 32 to provide an angular displacement 86 of the first chopper 32, relative to its axis of rotation 34 and the second chopper 36, via the worm 84 to adjust a timing of operation between the first and second choppers 32, 36. Illustratively, the adjuster 82 is drivingly coupled to the first chopper 32 but not the second chopper 36 (or vice versa) to provide the non-zero angular displacement 86 of the first chopper 32 relative to its axis of rotation 34 via the worm 84 and no angular displacement of the second chopper 36 relative to its axis of rotation 38.

The adjuster 82 comprises the gearset 60 to which the worm 84 is drivingly coupled. The gearset 60 meshes with the worm 84. In the case of a planetary gearset 60, the ring gear 64 is included in a ring 88 of the gearset 60, such that the ring 88 comprises the ring gear 64 and a worm gear 90. The ring gear 64 is provided on an inner diameter of the ring 88, and the worm gear 90 is provided on an outer diameter of the ring 88 and meshes with the worm 84. The worm 84 is positioned in the housing 49.

In use, the chopping system 20 receives the mat of severed crop material from the feed system 18 and cuts the crop stalk into billets ("chopping operation"). During the chopping operation, the motor 46 drives rotation of the first and second choppers 32, 36 via the first and second drive paths 54, 56, respectively, to cut the crop stalk. With respect to the first drive path 54, power flows from the pinion 52 through the intermediate gear 58, the shaft 62, the sun gear 66, the planets 68, and the planet carrier 70 to the first chopper 32. With respect to the second drive path 56, power flows from the pinion 52 through the first gear 76, the shaft 80, the second gear 78, and the output gear 74 to the second chopper 36. When the timing of operation between the first and second choppers 32, 36 is not being adjusted, the worm 84 and the ring 88 may be inactive, such that they are stationary relative to one another and to the planets 68.

Figure 6:
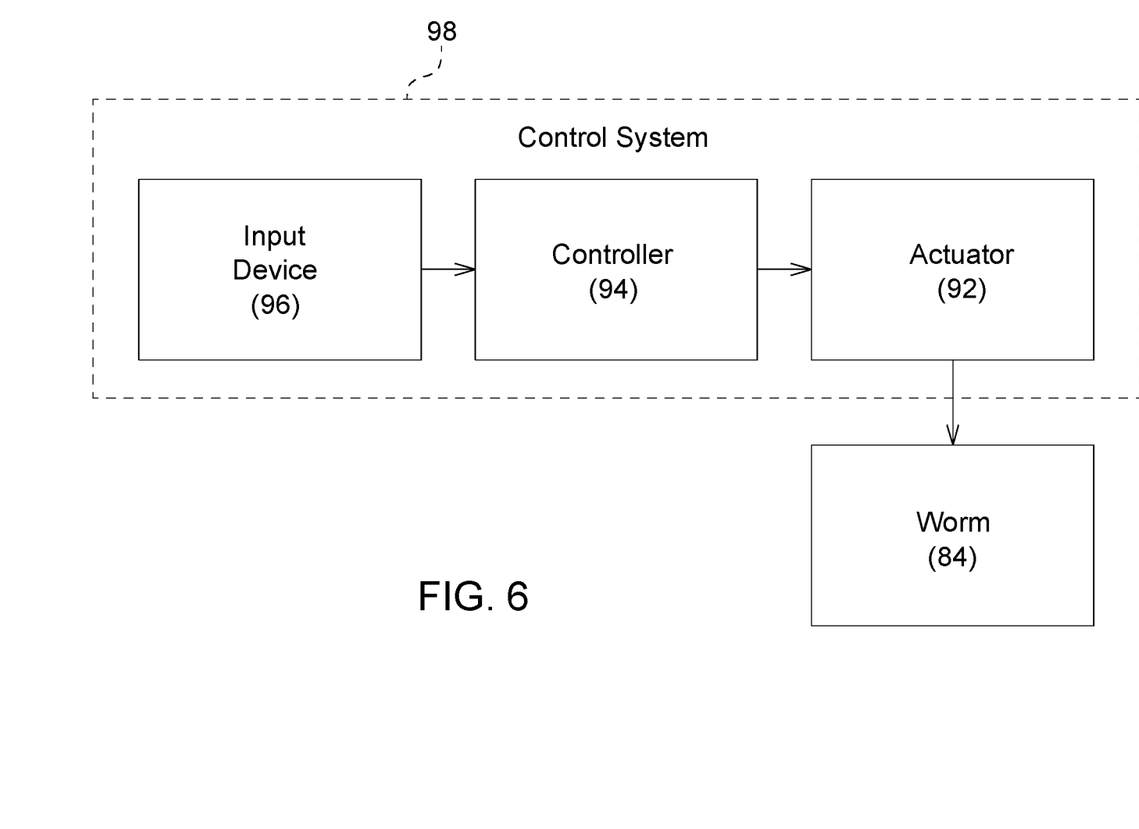
FIG. 6 is a diagrammatic view showing a control system for operating the worm.

Referring to FIG. 6, the timing of operation between the first and second choppers 32, 36 may be adjusted without disassembling any components. To adjust the timing of operation between the first and second choppers 32, 36, the worm 84 is actuated by rotation about its axis of rotation. The adjuster 82 may comprise an actuator 92 to actuate the worm 84, such that the actuator 92 is drivingly coupled to the first chopper 32 via the worm 84, and thus drivingly coupled to the worm 84. Hence, power flows from the actuator 92 through the worm 84, the worm gear 90, the ring gear 64, the planets 68, and the planet carrier 70 to the first chopper 32.

The worm 84 may be actuated in a variety of ways. For example, the worm 84 may be manually actuatable. In such a case, the actuator 92 may be a hand tool (e.g., a wrench) or other manual actuator.

In another example, the actuator 92 may be an electric motor to actuate the worm 84 (or other suitable type of motor). The electric motor may be an electric stepper motor. In the case of an electric motor, the actuator 92 is under the control of a controller 94. The controller 94 may comprise a processor and a memory electrically coupled to the processor and having stored therein instructions which, when executed by the processor, causes the controller 94 to output a control signal to activate the actuator 92 to adjust the timing of operation between the choppers 32, 36 and to deactivate the actuator 92 in response to an input signal.

The input signal may be generated by an input device 96, which may take a wide variety of forms. For example, the input device 96 may be a user input device for manual adjustment of the timing by a human operator of the crop harvester 10 during operation of the chopping system 20. In such a case, the input device 96 may comprise, for example, a button or other type of manually operable switch. The device 96 may be located in the operator's station of the crop harvester 10 for ready access to the operator. The operator may visually observe that leaves of the crop (e.g., sugarcane leaves) have not been completely or sufficiently cut from the billets, indicating that the chopper timing may need to be adjusted. Elapse of an amount of chopping operation time may be another indicator that the chopper timing may need to be adjusted. The operator may then activate the input device 96 momentarily (e.g., pressing the button) so as to generate the input signal. In response to the input signal, the controller 94 may output the control signal to activate the actuator 92 so as to adjust the timing operation of the choppers 32, 36 by rotating the first chopper 32 toward the second chopper 36 so as to tighten the engagement between the blades 40 of the first chopper 32 and the blades 42 of the second chopper 36. Another button of the input device 96 may be activated momentarily to loosen the engagement. The operator may determine that adequate chopper timing has been achieved by dynamic visual inspection of the billets. In another embodiment, a three-position momentary rocker switch (with neutral center position) may be used in place of two buttons.

In other embodiments, the chopper timing may be adjusted automatically, independent of operator or mechanic input, during operation of the chopping system 20. The input signal may be generated automatically based on various parameters such as, for example, hydraulic pressure, torque, sound, or vibration.

In the case of hydraulic pressure, the input device 96 may be a pressure sensor in the hydraulic circuit of the motor 46 configured to sense a hydraulic pressure in that circuit, such that the hydraulic pressure is indicative of the level of tightness between the choppers 32, 36. The controller 94 may determine if the hydraulic pressure is below a lower threshold based on the input signal from the input device 96. If so, the controller 94 may output the control signal to tighten engagement between the choppers 32, 36. The controller 94 may do so until the hydraulic pressure level reaches an upper threshold based on the input signal, at which point the controller 94 may output the control signal to a hydraulic pressure setpoint below the upper threshold so that chopper engagement is just under the point of being too tight corresponding to the upper threshold.

In the case of torque, the input device 96 may include technology for measuring an indication of torque, such that the torque level is indicative of the level of tightness between the choppers 32, 36. For example, an indication of torque may be obtained by measuring hydraulic pressure by a pressure sensor as the input device 96 in the hydraulic circuit of the motor 46. In another example, an indication of torque may be obtained by measuring strain by a strain gauge as the input device 96 on, for example, the shaft 62 or an output shaft 75 associated with the output gear 74. The controller 94 may determine if the torque level is below a lower threshold based on the input signal from the input device 96. If so, the controller 94 may output the control signal to tighten engagement between the choppers 32, 36. The controller 94 may do so until the hydraulic pressure or strain reaches an upper threshold based on the input signal, at which point the controller 94 may output the control signal to a hydraulic pressure or strain setpoint below the upper threshold so that chopper engagement is just under the point of being too tight corresponding to the upper threshold.

In the case of sound, the input device 96 may be a microphone positioned near the chopping system 20, such that the sound level is indicative of the level of tightness between the choppers 32, 36. The controller 94 may determine if the sound level is below a lower threshold based on the input signal from the input device 96. If so, the controller 94 may output the control signal to tighten engagement between the choppers 32, 36. The controller 94 may do so until the sound level reaches an upper threshold based on the input signal, at which point the controller 94 may output the control signal to a sound level setpoint below the upper threshold so that chopper engagement is just under the point of being too tight corresponding to the upper threshold.

In the case of vibration, the input device 96 may be an accelerometer, such the vibration level is indicative of the level of tightness between the choppers 32, 36. Harder or softer contact between the blades 40, 42 results in greater or lesser vibration. The controller 94 may determine if the vibration level is below a lower threshold based on the input signal from the input device 96. If so, the controller 94 may output the control signal to tighten engagement between the choppers 32, 36. The controller 94 may do so until the vibration level reaches an upper threshold based on the input signal, at which point the controller 94 may output the control signal to a vibration level setpoint below the upper threshold so that chopper engagement is just under the point of being too tight corresponding to the upper threshold. The accelerometer may be positioned, for example, on a chopper frame 100 of the chopping system 20 to which the choppers 32, 36 are mounted, the chopper frame 100 being mounted to a main frame 102 of the crop harvester 10 via a number of isolators 104 (e.g., four). In another embodiment, the accelerometer may be positioned, for example, on the gearbox housing 49.

The controller 94, the input device 96, and the actuator 92 are included in a control system 98 of the crop harvester 10. The control system 98 may be configured in a wide variety of ways. For example, the control system 98 may be configured such that one or both of the input device 96 and the actuator 92 are electrically coupled directly to the controller 94 or electrically coupled to the controller 94 via a CAN (controller area network). In the case of a CAN, the controller 94 may be one of a number of controllers electrically coupled to a CAN bus. One or both of the input device 96 and the actuator 92 may be electrically coupled directly to the same or a different one of the controllers for ultimate communication with the controller 94. Further, the operations of the controller 94 may be split among a number of the controllers. As such, in view of the foregoing, the control system 98 may generally be described as comprising the input device 96 configured to receive an input (e.g., user input, pressure, torque, sound, or vibration), the actuator 92 drivingly coupled to the worm 84, and the controller 94 configured to output a control signal to control the actuator 92 in response to an input signal indicative of the input.

It is to be understood that the gears disclosed herein would have suitable teeth, including without limitation, the gears of the transmission 51, the gearset 60, and the worm 84 (the teeth are not shown (other than on shaft 50 and the mating portion of the pinion 52) for ease of illustration). It is to be understood that the gearbox 47 would include other portions (not shown for ease of illustration), such as, for example, bearings for the various gears, and additional portions of the housing 49 for holding the bearings in place. There may also be a seal associated with the housing outlet 105 and a seal associated with the housing outlet 106, to block material flow into or out of the interior region of the gearbox housing 49 through the outlets 105, 106.

While the disclosure has been illustrated and described in detail in the drawings and foregoing description, such illustration and description is to be considered as an example and not restrictive in character, it being understood that an illustrative embodiment has been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the appended claims.

What is claimed is:

1. A chopping system for a crop harvester, comprising
a first chopper having an axis of rotation and a second chopper having an axis of rotation, the first and second choppers configured to rotate about their respective axes of rotation to cooperatively cut crop stalk into billets, and
a chopper-timing adjuster configured to provide a difference in angular displacement between the first chopper relative to its axis of rotation and the second chopper relative to its axis of rotation to adjust a timing of operation between the first and second choppers, the chopper-timing adjuster comprising a worm to drive the difference in angular displacement, wherein the chopper-timing adjuster comprises a planetary gearset to which the worm is drivingly coupled.

2. The chopping system of claim 1, wherein the chopper-timing adjuster is drivingly coupled to the first chopper but not the second chopper to provide a non-zero angular displacement of the first chopper relative to its axis of rotation via the worm and no angular displacement of the second chopper relative to its axis of rotation.

3. The chopping system of claim 1, wherein the planetary gearset comprises a ring gear meshing with the worm.

4. The chopping system of claim 1, wherein the planetary gearset is drivingly coupled to the first chopper.

5. The chopping system of claim 4, comprising a chopper drive configured to drive rotation of the first chopper and the second chopper, wherein the planetary gearset is included in the chopper drive.

6. The chopping system of claim 1, wherein the planetary gearset comprises a ring gear, a sun gear, planets meshing with the sun gear and the ring gear, and a planet carrier mounted to the planets and drivingly coupled to the first chopper.

7. The chopping system of claim 6, comprising a ring, wherein the ring comprises the ring gear and a worm gear, the ring gear is provided on an inner diameter of the ring and meshes with the planets, and the worm gear is provided on an outer diameter of the ring and meshes with the worm gear.

8. The chopping system of claim 6, comprising a motor drivingly coupled to the first chopper via a first drive path comprising the sun gear, the planets, and the planet carrier and to the second chopper via a second drive path.

9. The chopping system of claim 1, wherein the worm is manually actuatable.

10. The chopping system of claim 1, comprising an electric motor drivingly coupled to the worm.

11. The chopping system of claim 1, comprising a first motor drivingly coupled to the first chopper and the second chopper, wherein the chopper-timing adjuster comprises a second motor drivingly coupled to the first chopper via the worm.

12. The chopping system of claim 1, comprising an input device configured to receive an input, an actuator drivingly coupled to the worm, and a controller configured to output a control signal to control the actuator in response to an input signal indicative of the input.

13. The chopping system of claim 1, wherein the chopping system is included in a sugarcane harvester.

14. A chopper-timing adjuster for a chopping system of a crop harvester, the chopping system comprising a first chopper having an axis of rotation and a second chopper having an axis of rotation, the first and second choppers configured to rotate about their respective axes of rotation to cooperatively cut crop stalk into billets, the chopper-timing adjuster comprising a worm and drivingly coupled to the first chopper to provide an angular displacement of the first chopper, relative to its axis of rotation and the second chopper, via the worm to adjust a timing of operation between the first and second choppers, the chopper-timing adjuster comprising a gearset meshing with the worm and drivingly coupled to the first chopper, wherein the gearset is a planetary gearset.

15. The chopper-timing adjuster of claim 14, wherein the planetary gearset comprises a ring, a sun gear, planets, and a planet carrier, the ring comprises a ring gear on its inner diameter and a worm gear on its outer diameter, the worm gear meshes with the worm, the planets mesh with the sun gear and the ring gear, and the planet carrier is mounted to the planets and is drivingly coupled to the first chopper.

16. A chopping system for a crop harvester, comprising
a first chopper having an axis of rotation and a second chopper having an axis of rotation, the first and second choppers configured to rotate about their respective axes of rotation to cooperatively cut crop stalk into billets, and
a chopper-timing adjuster comprising a worm and configured to adjust a timing of operation between the first chopper and the second chopper by use of the worm, wherein the chopper-timing adjuster comprises a planetary gearset to which the worm is drivingly coupled.

* * * * *